US012649411B2

(12) United States Patent
Kito et al.

(10) Patent No.: US 12,649,411 B2
(45) Date of Patent: Jun. 9, 2026

(54) ADAPTIVE VEHICLE HEADLAMP BASED ON OBJECT POSITION

(71) Applicant: KOITO MANUFACTURING CO., LTD., Tokyo (JP)

(72) Inventors: Masanori Kito, Shizuoka (JP); Hiroki Kawai, Shizuoka (JP); Akinori Matsumoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 19/012,857

(22) Filed: Jan. 8, 2025

(65) Prior Publication Data

US 2025/0222856 A1     Jul. 10, 2025

(30) Foreign Application Priority Data

Jan. 10, 2024     (JP) ................................. 2024-001654

(51) Int. Cl.
B60Q 1/14          (2006.01)
F21S 41/663     (2018.01)
F21W 102/14     (2018.01)

(52) U.S. Cl.
CPC ............ B60Q 1/143 (2013.01); F21S 41/663 (2018.01); B60Q 2300/052 (2013.01); B60Q
*2300/056* (2013.01); *B60Q 2300/41* (2013.01); *B60Q 2300/42* (2013.01); *F21W 2102/14* (2018.01)

(58) Field of Classification Search
CPC   B60Q 1/143; B60Q 2300/41; B60Q 2300/42; F21W 2102/14; F21S 41/663
See application file for complete search history.

(56) References Cited

U.S. PATENT DOCUMENTS

| | | | |
|---|---|---|---|
| 9,550,448 B2 * | 1/2017 | Tanaka | F21S 41/143 |
| 2016/0238210 A1 * | 8/2016 | Masuda | F21S 41/692 |
| 2019/0145595 A1 * | 5/2019 | Takada | F21S 41/43 |
| | | | 362/538 |
| 2023/0311744 A1 * | 10/2023 | Yamamoto | B60Q 1/143 |
| | | | 362/466 |
| 2023/0382289 A1 * | 11/2023 | Watano | H04N 23/74 |

FOREIGN PATENT DOCUMENTS

JP          2018-018590 A          2/2018

* cited by examiner

*Primary Examiner* — Robert J May
(74) *Attorney, Agent, or Firm* — LICA, Inc.

(57)          ABSTRACT
A vehicle headlamp mounted on a vehicle is capable of forming at least a first light distribution pattern projected onto an area below a cutoff line and a second light distribution pattern projected along the cutoff line to overlap with the cutoff line. At least a partial projection area of the second light distribution pattern is adjusted in luminous intensity according to a position of a target object outside the vehicle.

9 Claims, 13 Drawing Sheets

ADAPTIVE VEHICLE HEADLAMP BASED ON OBJECT POSITION

CROSS-REFERENCE TO RELATED APPLICATIONS

This application is based on and claims priority from Japanese Patent Application No. 2024-001654, filed on Jan. 10, 2024, with the Japan Patent Office, the disclosure of which is incorporated herein in its entirety by reference.

TECHNICAL FIELD

The present disclosure relates to a vehicle headlamp.

BACKGROUND

Japanese Patent Laid-Open Publication No. 2018-018590 discloses a vehicle lighting device capable of achieving a good low-beam light distribution pattern by blurring the light-dark boundary of a cutoff line appropriately while suppressing the G-value from increasing beyond the statutory reference value.

SUMMARY

There is a demand to form a light distribution pattern with good visibility while suppressing the occurrence of glare toward an oncoming vehicle.

The present disclosure provides a vehicle headlamp capable of projecting a light distribution pattern that provides sufficient visibility while suppressing the occurrence of glare.

According to one aspect of the present disclosure, a vehicle headlamp mounted on a vehicle, is capable of forming at least a first light distribution pattern projected onto an area below a cutoff line and a second light distribution pattern projected along the cutoff line to overlap with the cutoff line, and at least a partial projection area of the second light distribution pattern is adjusted in luminous intensity according to a position of a target object outside the vehicle.

The present disclosure may provide a vehicle headlamp capable of projecting a light distribution pattern that provides sufficient visibility while preventing or suppressing the occurrence of glare.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
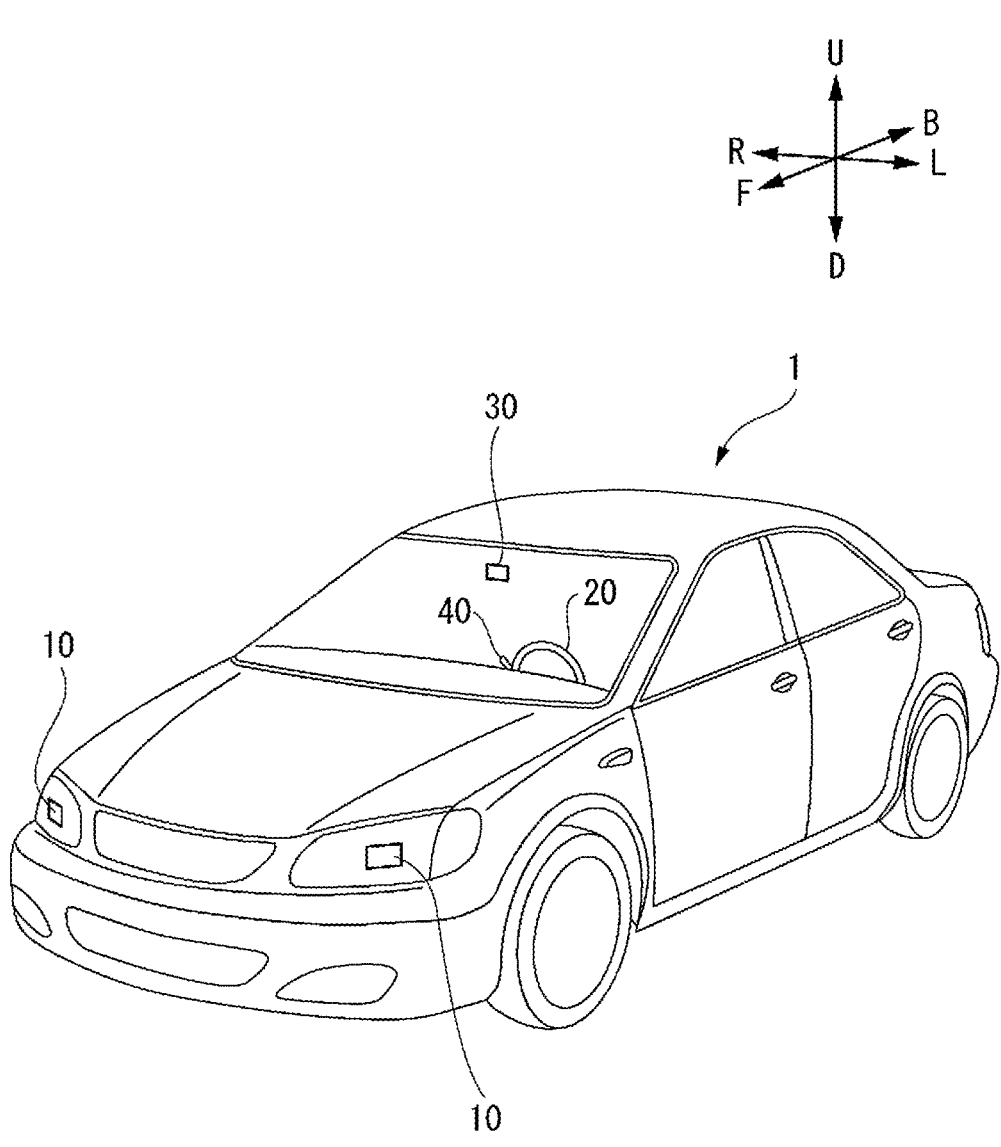
FIG. 1 is a perspective view illustrating an example of a vehicle equipped with a vehicle headlamp according to an embodiment of the present disclosure (hereinafter, simply referred to as "the present embodiment").

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

Hereinafter, the present embodiment will be described with reference to the drawings. The dimensions of each member illustrated in these drawings may differ from the actual dimensions of each member for the convenience of description.

Further, in the description of the present embodiment, terms such as "left-right direction," "up-down direction," and "front-back direction," may be appropriately mentioned for the convenience of description. These directions are relative directions set for a vehicle 1 illustrated in FIG. 1. Here, the "left-right direction" includes both "left direction" and "right direction" and also refers to the width direction of the vehicle 1. The "up-down direction" includes both the "upward direction" and the "downward direction." The "front-back direction" includes both the "forward direction" and the "backward direction." The front-back direction is orthogonal to both the left-right direction and the up-down direction. In each drawing, the reference character U indicates the upward direction, the reference character D indicates the downward direction, the reference character F indicates the forward direction, the reference character B indicates the backward direction, the reference character L indicates the leftward direction, and the reference character R indicates the rightward direction.

FIG. 1 is a perspective view illustrating an example of the vehicle 1 equipped with a headlamp 10 (vehicle headlamp) according to the present embodiment. The vehicle 1 is an automobile that may travel, for example, in a manual driving mode and/or an automatic driving mode. The vehicles equipped with the headlamp 10 of the present embodiment are not limited to automobiles but may also be motorcycles or other mobile objects.

As illustrated in FIG. 1, the vehicle 1 is equipped with the headlamp 10, a steering device 20, a camera 30, and a light switch 40. The headlamp 10 is arranged on each of the front right and front left sides of the vehicle 1. The steering device 20 is installed, for example, in the interior of the vehicle 1. The camera 30 is arranged, for example, near a windshield. The camera 30 is arranged between the headlamp 10 arranged on the front right side of the vehicle 1 and the headlamp 10 arranged on the front left side of the vehicle 1 in the width direction (left-right direction in FIG. 1) of the vehicle 1. The light switch 40 is installed, for example, near the steering device 20.

Figure 2:
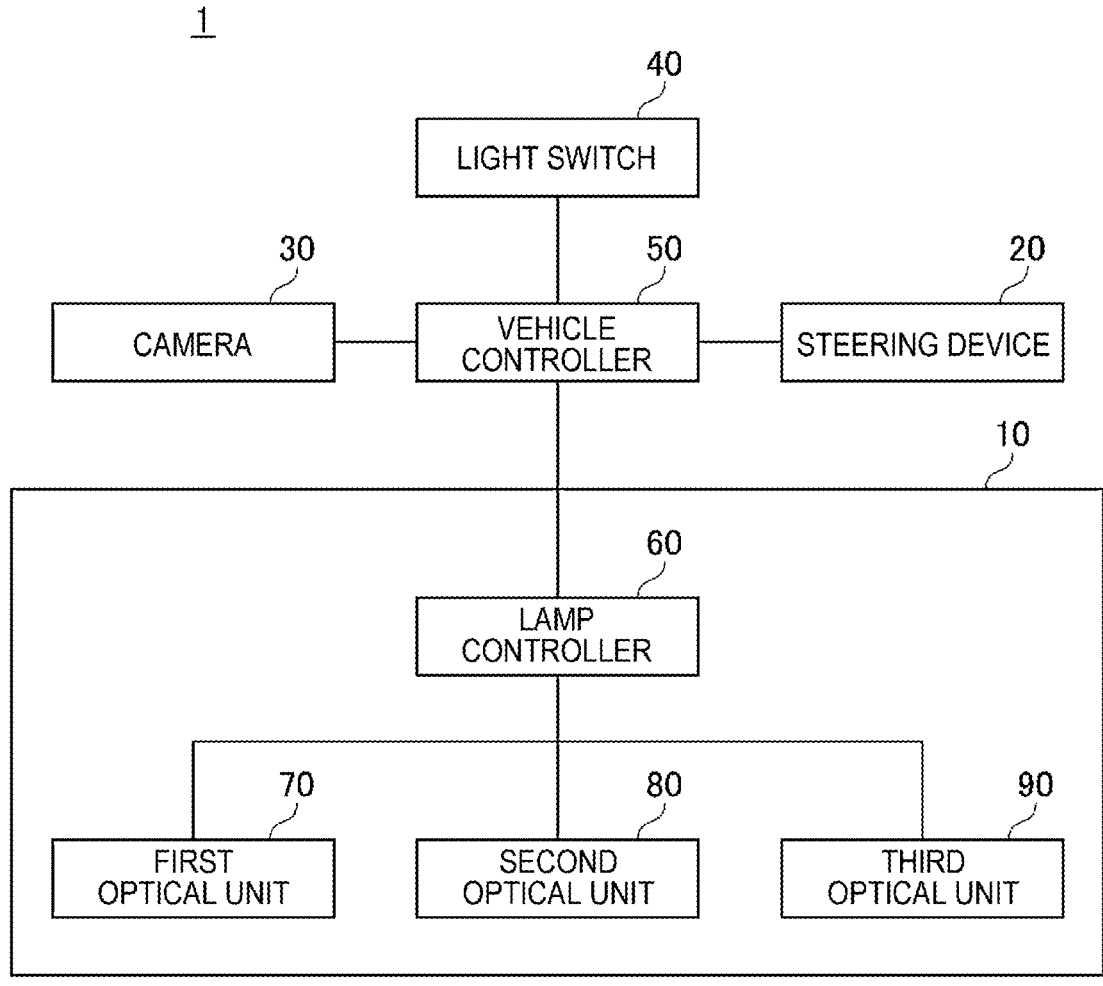
FIG. 2 is a block diagram illustrating an example of a system configuration of the vehicle.

FIG. 2 is a block diagram illustrating an example of a system configuration of the vehicle 1. As illustrated in FIG. 2, the vehicle 1 includes a vehicle controller 50 that controls the driving of the vehicle 1. The headlamp 10, steering device 20, camera 30 and light switch 40 are connected to the vehicle controller 50. Further, the headlamp 10 includes a lamp controller 60, a first optical unit 70, a second optical unit 80, and a third optical unit 90.

The steering device 20 is constituted with, for example, a steering wheel.

The camera 30 is a camera that includes an imaging device such as a charge-coupled device (CCD) or complementary MOS (CMOS). The camera 30 acquires imaging data by capturing images of the surroundings of the vehicle 1 (e.g., the front of the vehicle 1). The camera 30 outputs the acquired imaging data to the vehicle controller 50.

The light switch 40 is configured to switch the headlamp 10 ON or OFF and to change a light distribution pattern to be projected, for example, according to an operation by a driver of the vehicle 1. The driver of the vehicle 1 may select whether to activate a low beam or high beam by operating the light switch 40. When the driver of the vehicle 1 operates the light switch 40, the light switch 40 generates a control signal to project a light distribution pattern according to the operation, and transmits the generated control signal to the vehicle controller 50.

The vehicle controller 50 is configured to determine the surrounding environment of the vehicle 1 based on surrounding environment information and to transmit the determined result to the lamp controller 60. The vehicle controller 50 may be constituted with, for example, at least one electronic control unit (ECU). The electronic control unit includes, for example, a computer system including one or more processors and one or more memories as well as an electronic circuit including active elements such as transistors and passive elements.

The vehicle controller 50 is configured to analyze the imaging data output from the camera 30. The vehicle controller 50 detects surrounding environment information indicating the surrounding environment of the vehicle 1 from the imaging data, and transmits the detected surrounding environment information to the lamp controller 60. The surrounding environment information includes, for example, positional information on a target object located outside the vehicle 1. A position outside the vehicle 1 includes, for example, a position in the left-right direction as viewed from the vehicle 1 and a position in the longitudinal direction as viewed from the vehicle 1. The target object relative to the vehicle 1 include, for example, an oncoming vehicle, a preceding vehicle, a pedestrian, and a sign. The positional information includes, for example, an angular coordinate indicating the orientation of the target object in degrees and a distance coordinate indicating the proximity of the target object in distance, when viewed from the vehicle 1.

The vehicle controller 50 transmits a signal for controlling the headlamp 10 to the lamp controller 60 based on the control signal from the light switch 40. For example, it is assumed that the driver of the vehicle 1 operates the light switch 40 to project a low-beam light distribution pattern. In this case, the vehicle controller 50 receives a control signal for projecting the low-beam light distribution pattern from the light switch 40 and transmits the received control signal to the lamp controller 60. Further, for example, it is assumed that the driver of the vehicle 1 operates the light switch 40 to project a high-beam light distribution pattern. In this case, the vehicle controller 50 receives a control signal for projecting the high-beam light distribution pattern from the light switch 40 and transmits the received control signal to the lamp controller 60.

The lamp controller 60 may have the same hardware configuration as that of the vehicle controller 50. The lamp controller 60 is configured to control the first optical unit 70, second optical unit 80, and third optical unit 90 based on the control signal received from the vehicle controller 50. The control signal may include, for example, surrounding environment information, in addition to information depending on the operation of the light switch 40.

The first optical unit 70 is an optical unit for projecting both the low-beam light distribution pattern and the high-beam light distribution pattern. The first optical unit 70 is capable of projecting light onto an area that includes a cutoff line and at least an area below the cutoff line. The first optical unit 70 is capable of projecting a "low-beam base pattern", which is a base light distribution pattern of the low-beam light distribution pattern. In the following description, the low-beam base pattern projected by the first optical unit 70 will also be referred to as "first light distribution pattern".

Similarly to the first optical unit 70, the second optical unit 80 is an optical unit for projecting both the low-beam light distribution pattern and the high-beam light distribution pattern. The second optical unit 80 is capable of projecting light onto an area along the cutoff line that includes an area overlapping the cutoff line, and is capable of dimming any area within that area. The second optical unit 80 is capable of projecting an "additional low-beam pattern", which is an additional light distribution pattern added to the low-beam base pattern (first light distribution pattern) projected by the first optical unit 70. The term "dimming" is used in the same way as for the third optical unit 90. In the following description, the additional low-beam pattern projected by the second optical unit 80 will also be referred to as "second light distribution pattern."

The third optical unit 90 is an optical unit for projecting the high-beam light distribution pattern. The third optical unit 90 is capable of projecting light onto an area that includes at least an area above the cutoff line and is capable of dimming any area within that area. The term "dimming" in this specification includes each of blocking at least part of light emitted from the third optical unit 90 and reducing the intensity of light emitted from the third optical unit 90. In the following description, the high-beam light distribution pattern projected by the third optical unit 90 will also be referred to as "third light distribution pattern."

Figure 3:
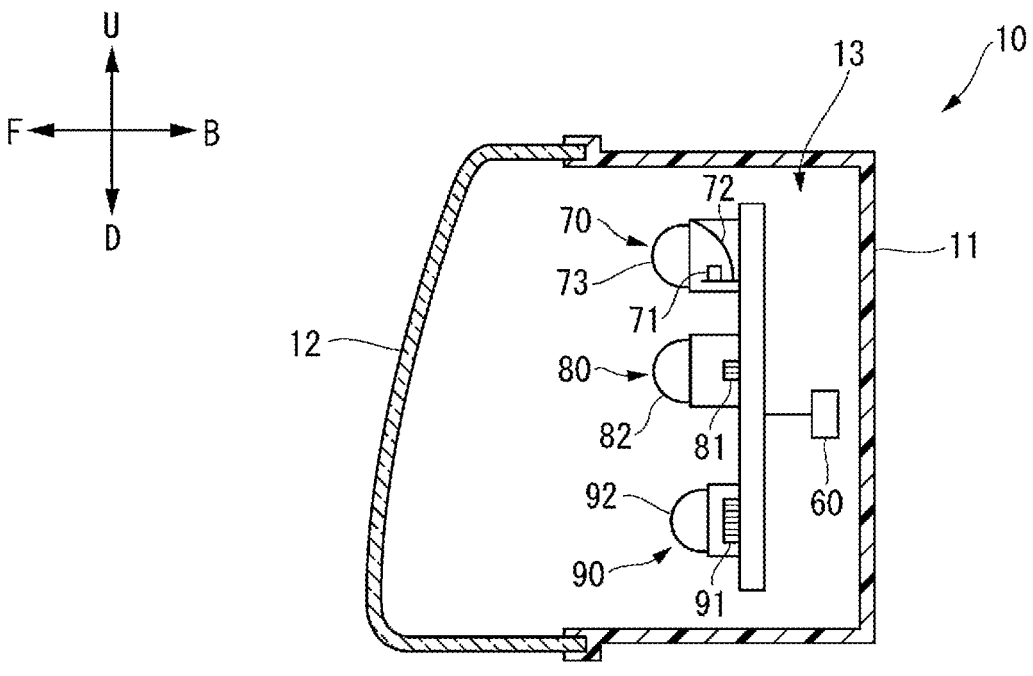
FIG. 3 is a cross-sectional view of the vehicle headlamp.

FIG. 3 is a cross-sectional view of the headlamp 10. As illustrated in FIG. 3, the headlamp 10 includes a lamp body 11 having an opening at the front of the headlamp 10 and a light-transmitting outer cover 12 that covers the opening of the lamp body 11. The lamp controller 60, first optical unit 70, second optical unit 80, and third optical unit 90 are accommodated inside a lamp chamber 13 formed by the lamp body 11 and the outer cover 12.

The first optical unit 70 includes, for example, at least one light source 71, a reflector 72, and a projection lens 73. The light source 71 may be constituted with, for example, a light emitting diode (LED) element or laser diode (LD) element. The light source 71 is configured to emit light toward the reflector 72. The reflector 72 is configured to reflect the light emitted from the light source 71 toward the projection lens 73. The projection lens 73 is, for example, an aspherical lens with a convex front surface and a flat back surface. The projection lens 73 is made of a light-transmitting material, for example, a transparent resin such as acrylic. The projection lens 73 is configured to project light reflected by the reflector 72 onto an area in front of the vehicle 1.

The second optical unit 80 includes a light source 81 and a projection lens 82. The light source 81 is constituted with, for example, an LED array. The LED array is, for example, a light source in which multiple micro-LED light-emitting elements are arranged in an array shape. The activated state of the multiple micro-LED light-emitting elements included in the light source 81 may be changed independently of each other. Therefore, the headlamp 10 is capable of performing ON/OFF control and brightness adjustment for each micro-LED light-emitting element included in the light source 81 under the control of the lamp controller 60. The projection lens 82 may have, for example, the same configuration as that of the projection lens 73.

The third optical unit 90 includes a light source 91 and a projection lens 92. The light source 91 is constituted with, for example, an LED array having multiple micro-LED light-emitting elements. The activated state of the multiple micro-LED light-emitting elements included in the light source 91 may be changed independently of each other. Therefore, the headlamp 10 is capable of performing ON/OFF control and brightness adjustment for each micro-LED light-emitting element included in the light source 91 under the control of the lamp controller 60. The projection lens 92 may have, for example, the same configuration as that of the projection lenses 73 and 82.

Next, a low-beam light distribution pattern PL projected from the headlamp 10 when the low beam is activated, and a high-beam light distribution pattern PH projected from the headlamp 10 when the high beam is activated will be respectively described with reference to FIGS. 4 and 5. In the present embodiment, description is made on a case where the vehicle 1 is driving in a right lane. Further, the low-beam light distribution pattern PL and the high-beam light distribution pattern PH represent a projection state on a virtual vertical screen at a predetermined position in front of the vehicle 1 (e.g., at a position of 25 m in front of the vehicle 1). Further, the low-beam light distribution pattern PL and the high-beam light distribution pattern PH show a V-V line that indicates the vertical direction (up-down direction in the drawing) at the center of the projection range of the headlamp 10 and an H-H line that extends in the horizontal direction (left-right direction in the drawing) orthogonal to the V-V line. Further, as for light distribution patterns exemplified in the subsequent drawings, each pattern similarly represents a projection state on the virtual vertical screen at a predetermined position in front of the vehicle 1, with the V-V and H-H lines illustrated.

Figure 4:
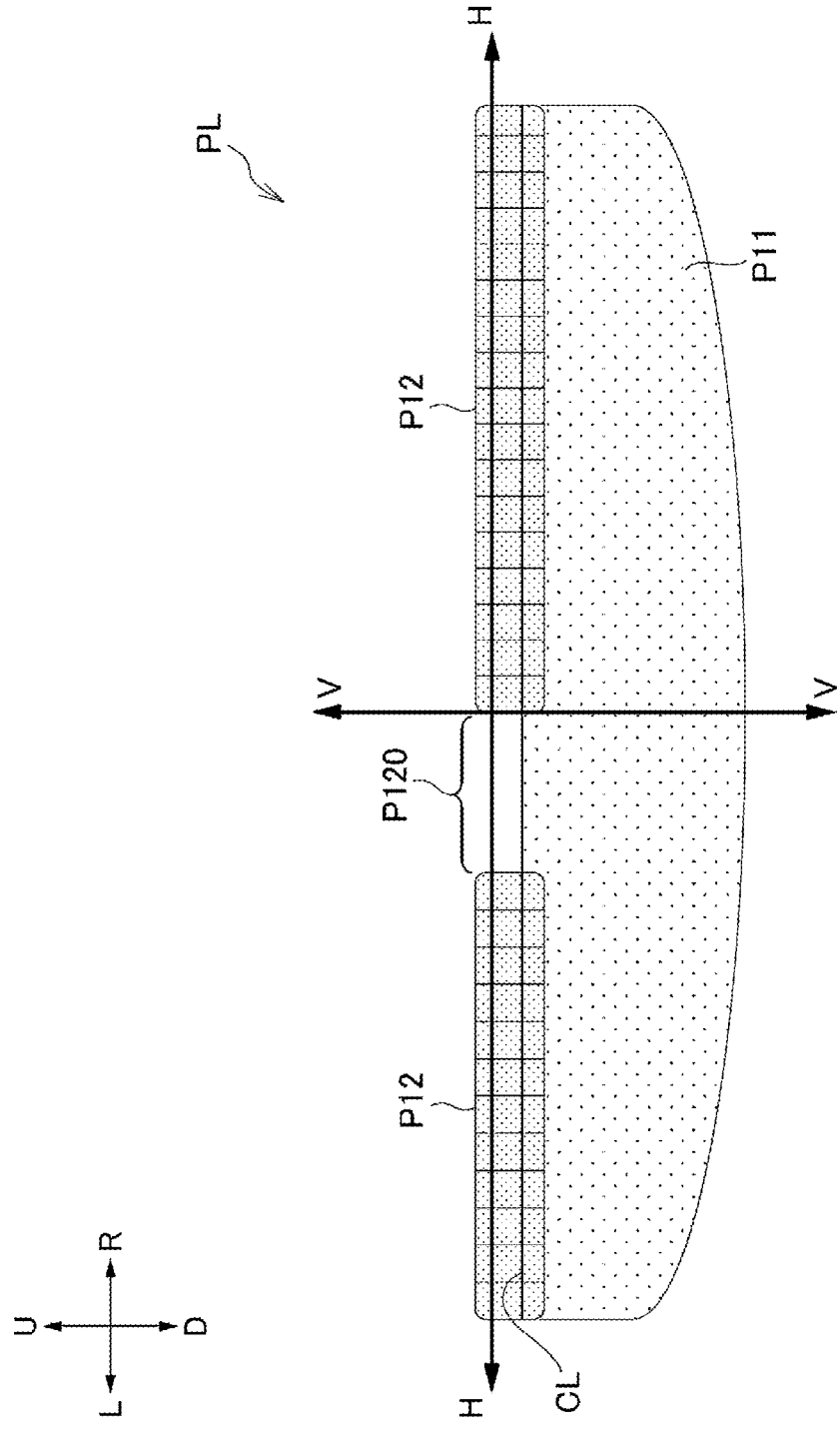
FIG. 4 is a diagram illustrating an example of a low-beam light distribution pattern of the vehicle headlamp.

FIG. 4 is a diagram illustrating an example of the low-beam light distribution pattern PL of the headlamp 10. As illustrated in FIG. 4, the low-beam light distribution pattern PL is constituted with a first light distribution pattern P11 and a second light distribution pattern P12. As described above, the first light distribution pattern P11 is the low-beam base pattern projected by the first optical unit 70. The second light distribution pattern P12 is the additional low-beam pattern projected by the second optical unit 80.

The first light distribution pattern P11 has a cutoff line CL that extends approximately parallel to the H-H line. The first light distribution pattern P11 is projected onto an area that includes the cutoff line CL and an area below the cutoff line CL.

The second light distribution pattern P12 is projected along the cutoff line CL of the first light distribution pattern P11 to overlap with the cutoff line CL. Therefore, an area where the projected first and second light distribution patterns P11 and P12 overlap each other is brighter than the area where only the first light distribution pattern P11 is projected without the second light distribution pattern P12. In this way, an area near the cutoff line CL of the low-beam light distribution pattern PL has a two-step brightness variation. It can be said that, counting from a non-projection area, the brightness in the area near the cutoff line CL of the low-beam light distribution pattern PL varies in three steps.

Further, since the second light distribution pattern P12 is projected to overlap with the cutoff line CL of the first light distribution pattern P11, the cutoff line CL formed when both the first and second light distribution patterns P11 and P12 are projected appears more blurred than the cutoff line CL formed when only the first light distribution pattern P11 is projected. In other words, the contrast between light and dark at the boundary of the cutoff line CL is blurred by projecting the second light distribution pattern P12 along the cutoff line CL of the first light distribution pattern P11 to overlap with the cutoff line CL. Since a general low-beam light distribution pattern is formed by blocking part of light, the contrast between light and dark at the cutoff line is usually clear. Therefore, the cutoff line CL of the low-beam light distribution pattern PL in the present embodiment appears more blurred than that of the general low-beam light distribution pattern.

Further, the second light distribution pattern P12 is divided into a plurality of projection areas, each of which may be independently changed for the illumination state thereof. The illumination state of the divided projection areas is changed by the light source 81 constituted with micro-LED light-emitting elements that allow individual ON/OFF control and brightness adjustment. The second light distribution pattern P12 is a light distribution pattern capable of adjusting the projection luminous intensity in an area where a target object such as an oncoming vehicle or preceding vehicle is present. In other words, the second light distribution pattern P12 is a light distribution pattern in which a luminous intensity adjustment area varies according to the presence or absence of the target object and the position thereof. In the example illustrated in FIG. 4, the boundaries between the respective projection areas included in the second light distribution pattern P12 are virtually represented by multiple thin lines extending in the vertical direction.

As illustrated in FIG. 4, the projection luminous intensity of the second light distribution pattern P12 is adjusted (deactivated) in an area that includes the V-V line and extends slightly to the left from the V-V line. In this example, the projection state of the second light distribution pattern P12 with a deactivated area P120 is the reference state. The reference state refers to a state where no target object is detected. However, the reference state is not limited to the projection state of this light distribution pattern. For example, in FIG. 4, it may also be the reference state for the second light distribution pattern P12 to have light projected onto the deactivated area P120, projecting the light onto all areas along the H-H line without gaps.

Figure 5:
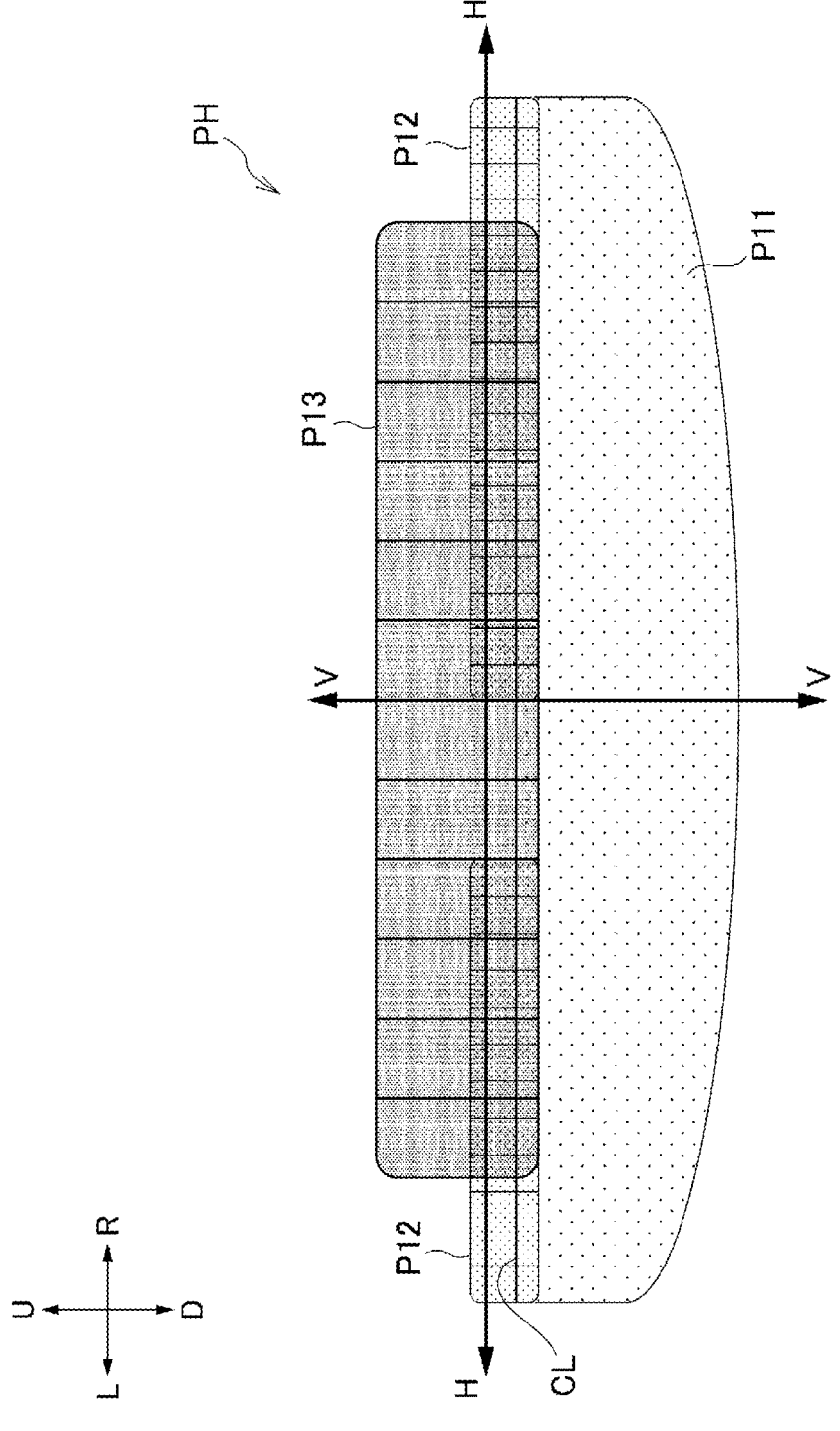
FIG. 5 is a diagram illustrating an example of a high-beam light distribution pattern of the vehicle headlamp.

FIG. 5 is a diagram illustrating an example of the high-beam light distribution pattern PH of the headlamp 10. As illustrated in FIG. 5, the high-beam light distribution pattern PH is constituted with the first light distribution pattern P11, the second light distribution pattern P12, and a third light distribution pattern P13. As described above, the third light distribution pattern P13 is the light distribution pattern projected by the third optical unit 90.

The first and second light distribution patterns P11 and P12 in FIG. 5 are the same as the respective light distribution patterns described in FIG. 4.

The third light distribution pattern P13 is projected onto an area that includes at least an area above the cutoff line CL. The third light distribution pattern P13 is divided into a plurality of projection areas, each of which may be independently changed for the illumination state thereof. The illumination state of the divided projection areas is changed by the light source 91 constituted with micro-LED light-emitting elements that allow individual ON/OFF control and brightness adjustment. In the example illustrated in FIG. 5, the boundaries between the respective projection areas included in the third light distribution pattern P13 are virtually represented by multiple thin lines extending in the vertical direction. Further, the third light distribution pattern P13 is projected such that a lower area of each projection area overlaps with part of the first and second light distribution patterns P11 and P12.

The third optical unit 90 in the present embodiment will be described below as an optical unit capable of projecting an adaptive drive beam (ADB) light distribution pattern. The ADB light distribution pattern is a light distribution pattern in which no light is projected onto an area where a target object such as a preceding vehicle or oncoming vehicle is present, within the high-beam light distribution pattern. In other words, the ADB light distribution pattern is a light distribution pattern in which a non-projection area varies according to the presence or absence of the target object or the position thereof.

First Embodiment

The low-beam light distribution pattern PL (PL1 and PL2) and the high-beam light distribution pattern PH (PH1) projected by the headlamp 10 when a target object is detected will be described with reference to FIGS. 6 to 8.

Figure 6:
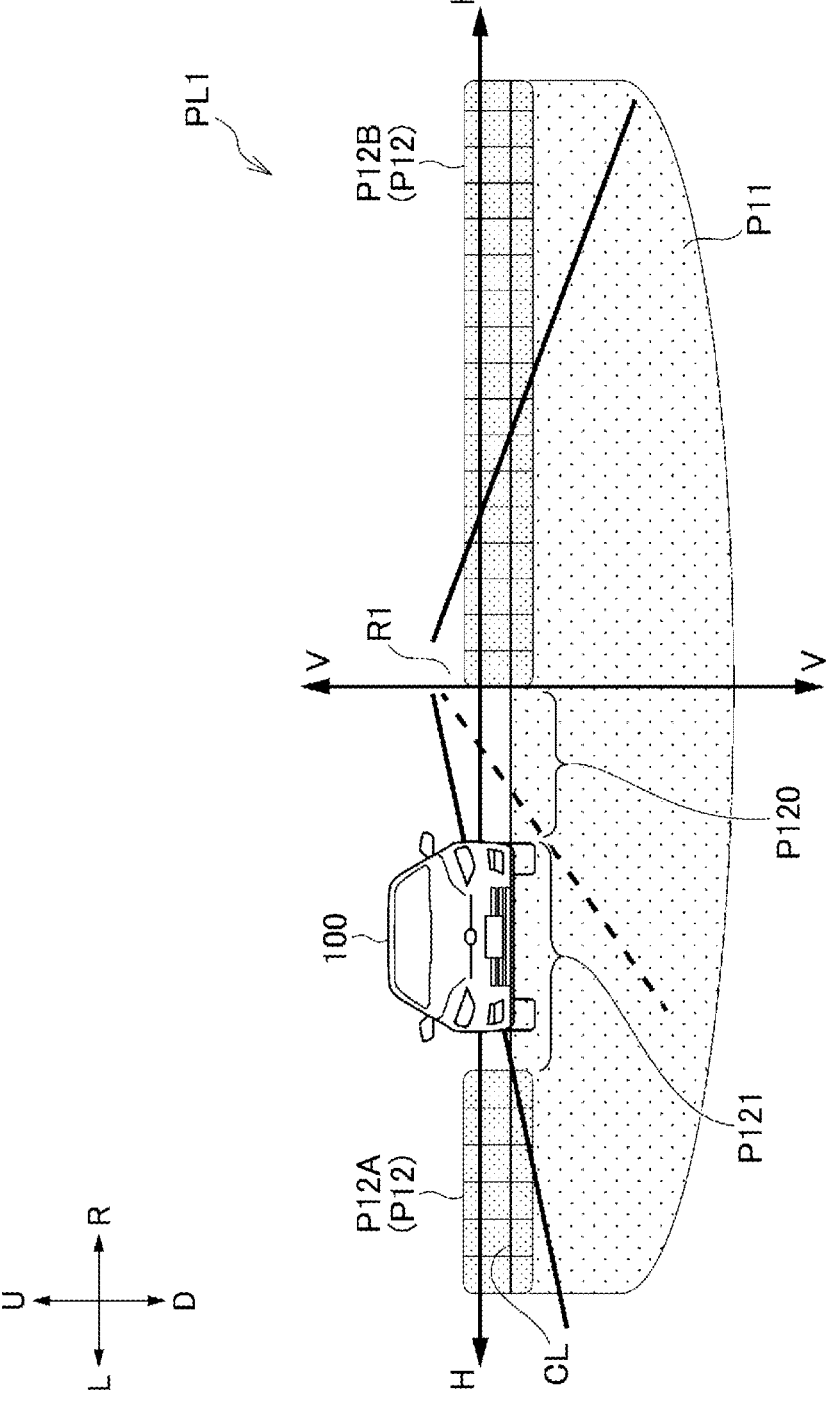
FIG. 6 is a diagram illustrating an example of a low-beam light distribution pattern projected when an oncoming vehicle is detected on a straight road.

FIG. 6 is a diagram illustrating an example of a low-beam light distribution pattern PL1 projected by the headlamp 10 when an oncoming vehicle is detected on a straight road R1. In the example illustrated in FIG. 6, it is assumed that the driver of the vehicle 1 operates the light switch 40 to project the low-beam light distribution pattern, and according to the operation, the lamp controller 60 of the headlamp 10 turns on the first optical unit 70 and the second optical unit 80 to project the low-beam light distribution pattern constituted with the first light distribution pattern P11 and the second light distribution pattern P12. Here, when the camera 30 of the vehicle 1 detects an oncoming vehicle 100 on the front left side, it outputs imaging data about the oncoming vehicle 100 to the vehicle controller 50. The vehicle controller 50 detects surrounding environment information including positional information on the oncoming vehicle 100 based on the imaging data output from the camera 30, and transmits the detected surrounding environment information to the lamp controller 60. The lamp controller 60 varies the activated state of the first optical unit 70 and the second optical unit 80 based on the surrounding environment information received from the vehicle controller 50, thereby projecting the low-beam light distribution pattern PL1 from the headlamp 10.

The lamp controller 60 adjusts the luminous intensity of a partial projection area, which depends on the position of the oncoming vehicle 100 on the straight road R1, in the second light distribution pattern P12 of the low-beam light distribution pattern PL1, to ensure that no light is emitted toward the oncoming vehicle 100. In this example, the lamp controller 60 dims or deactivates the luminous intensity of a partial projection area (oncoming vehicle area P121) depending on the oncoming vehicle 100 in a second light distribution pattern P12A, which is projected onto an opposing lane of the straight road R1.

As described above, the second light distribution pattern P12 formed by the second optical unit 80 is divided into a plurality of projection areas, each of which may be independently changed for the illumination state thereof. Therefore, the lamp controller 60 reduces the projection luminous intensity of the surroundings of the oncoming vehicle 100 by controlling the second optical unit 80 to prevent or suppress light projection in an area including the oncoming vehicle 100 among the plurality of projection areas of the second light distribution pattern P12. In the deactivated area P120 (see. e.g., FIG. 4) of the second light distribution pattern P12A in the opposing lane, the projection luminous intensity is dimmed or deactivated in the same manner as in the reference state. Further, the lamp controller 60 projects uniform light across the entirety of a second light distribution pattern P12B, which is projected onto a vehicle own lane of the straight road R1, without adjustment of the luminous intensity of a projection area in the second light distribution pattern P12B.

Figure 7:
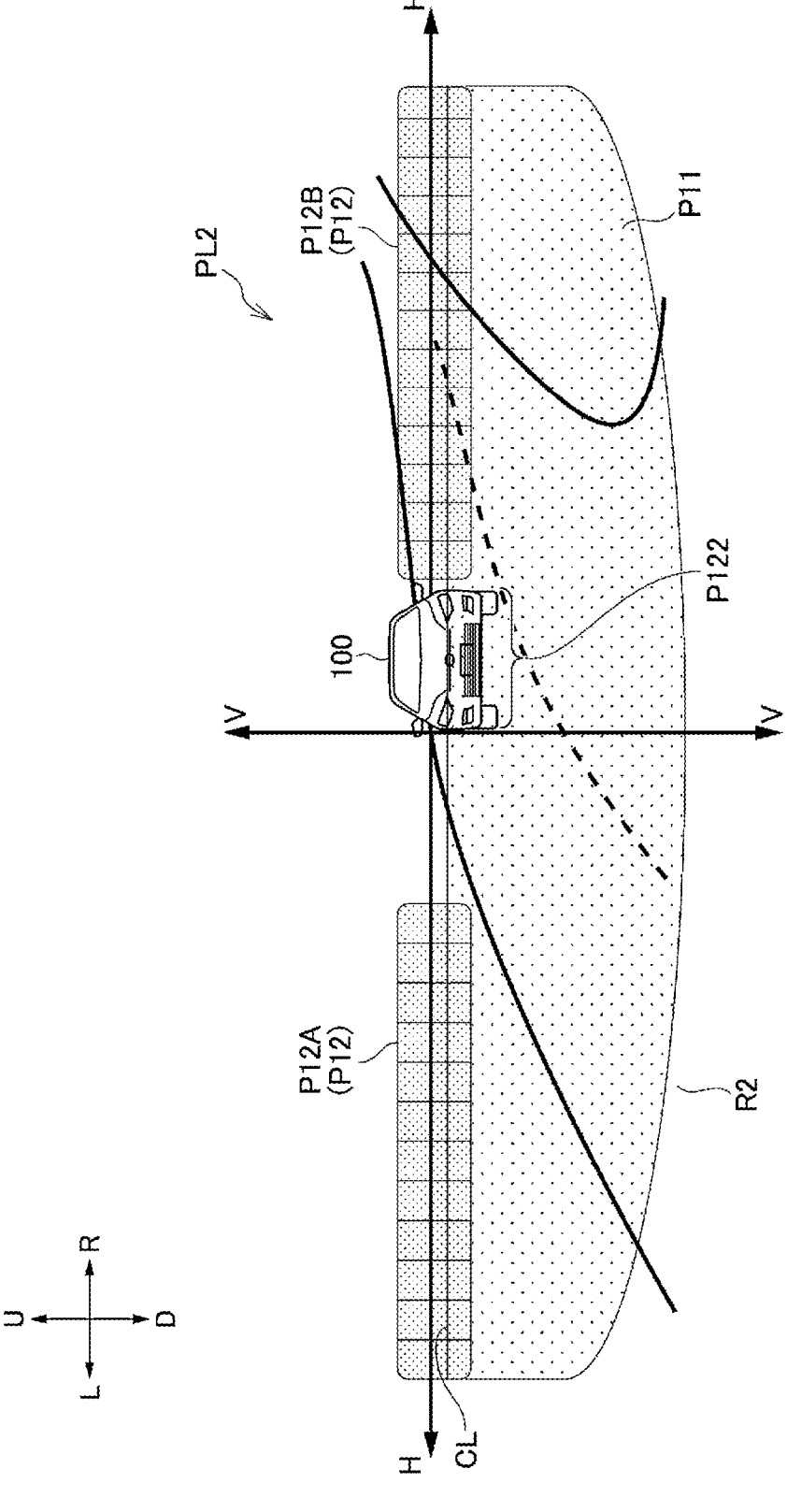
FIG. 7 is a diagram illustrating an example of a low-beam light distribution pattern projected when an oncoming vehicle is detected on a curved road.

FIG. 7 is a diagram illustrating an example of a low-beam light distribution pattern PL2 projected by the headlamp 10 when an oncoming vehicle is detected on a curved road R2. In the example illustrated in FIG. 7, it is described that the curved road R2 curves to the right and the vehicle 1 approaches the right curve. Since the vehicle 1 approaches the right curve, the oncoming vehicle 100 is driving in the left opposing lane but is located closer to the vehicle own lane (the right side in FIG. 7) than the left-right direction center in front of the vehicle 1.

When the camera 30 of the vehicle 1 detects the oncoming vehicle 100 ahead on the curved road R2, it outputs imaging data on the oncoming vehicle 100 to the vehicle controller 50 in the same way as in FIG. 6. The vehicle controller 50 transmits surrounding environment information on the oncoming vehicle 100 detected from the imaging data to the lamp controller 60. Then, the lamp controller 60 varies the activated state of the first optical unit 70 and the second optical unit 80 based on the surrounding environment information, and projects the low-beam light distribution pattern PL2 as illustrated in FIG. 7.

The lamp controller 60 adjusts the luminous intensity of a partial projection area, which depends on the position of the oncoming vehicle 100 on the curved road R2, in the second light distribution pattern P12 of the low-beam light distribution pattern PL2, to ensure that no light is emitted toward the oncoming vehicle 100. In this example, the lamp controller 60 dims or deactivates the luminous intensity of a partial projection area (oncoming vehicle area P122) depending on the oncoming vehicle 100 in a second light distribution pattern P12B, which is projected onto the vehicle own lane of the curved road R2. The lamp controller 60 projects uniform light across the entirety of the second light distribution pattern P12A, which is projected onto the opposing lane of the curved road R2, without adjustment of the luminous intensity of a projection area in the second light distribution pattern P12A.

Figure 8:
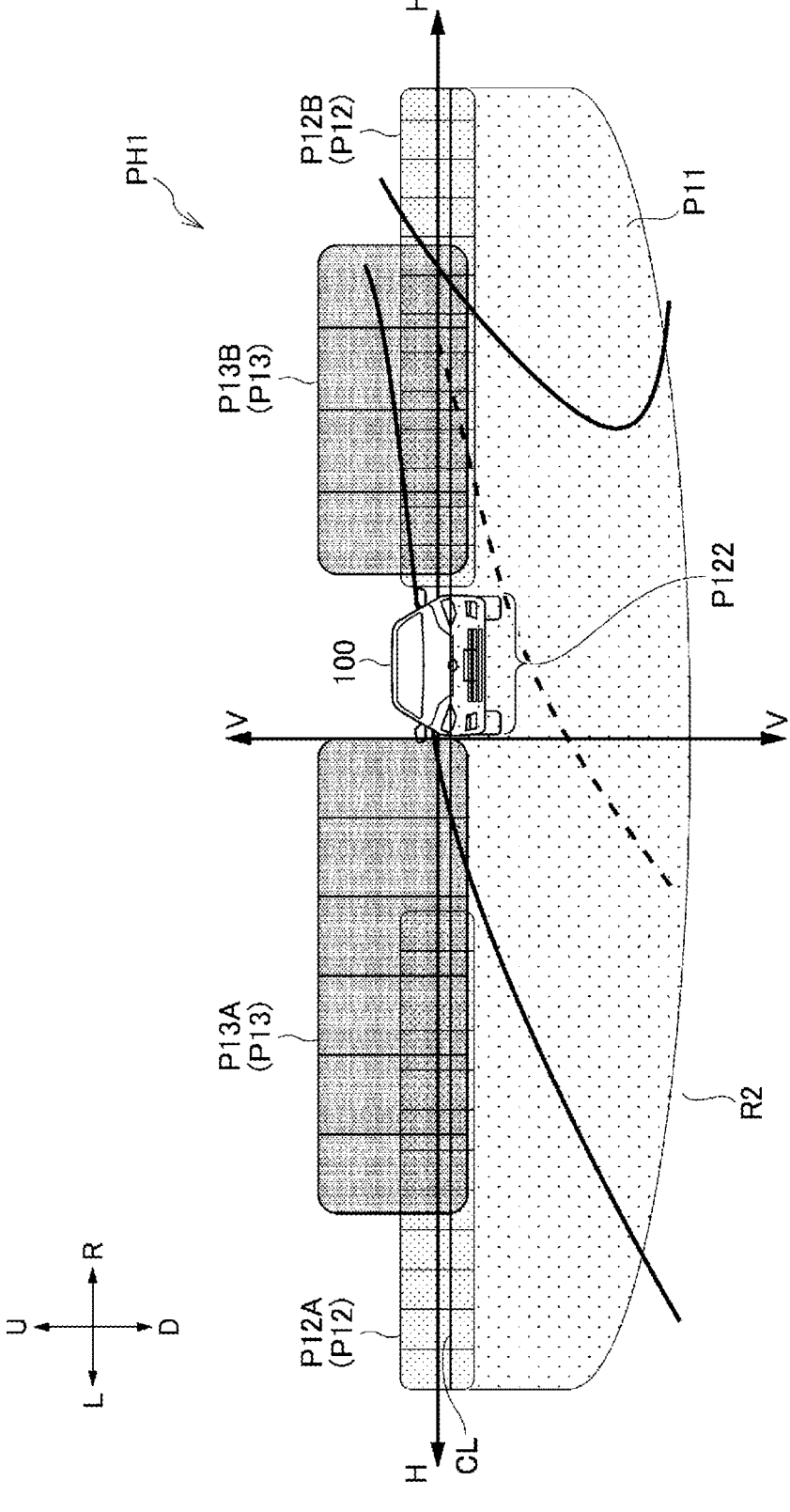
FIG. 8 is a diagram illustrating an example of a high-beam light distribution pattern projected when an oncoming vehicle is detected on a curved road.

FIG. 8 is a diagram illustrating an example of a high-beam light distribution pattern PH1 projected by the headlamp 10 when an oncoming vehicle is detected on the curved road R2. In the example illustrated in FIG. 8, similarly to the case of FIG. 7, it is assumed that the vehicle 1 approaches the curved road R2 that curves to the right, and the oncoming vehicle 100 is positioned closer to the vehicle own lane than the left-right direction center in front of the vehicle 1.

In the example illustrated in FIG. 8, it is assumed that the driver of the vehicle 1 operates the light switch 40 to project the high-beam light distribution pattern, and according to the operation, the lamp controller 60 of the headlamp 10 turns on the first optical unit 70, the second optical unit 80, and the third optical unit 90 to project the high-beam light distribution pattern constituted with the first light distribution pattern P11, the second light distribution pattern P12, and the third light distribution pattern P13. Here, when the camera 30 of the vehicle 1 detects the oncoming vehicle 100 in front of the vehicle, as in FIG. 6, it outputs imaging data on the oncoming vehicle 100 to the vehicle controller 50. The vehicle controller 50 transmits surrounding environment information on the oncoming vehicle 100 detected from the imaging data to the lamp controller 60. Then, the lamp controller 60 varies the activated state of the first optical unit 70, the second optical unit 80, and the third optical unit 90 based on the surrounding environment information, and projects the high-beam light distribution pattern PH1 as illustrated in FIG. 8.

The lamp controller 60 adjusts the luminous intensity of a partial projection area, which depends on the position of the oncoming vehicle 100 on the curved road R2, in the second light distribution pattern P12 and the third light distribution pattern P13 of the high-beam light distribution pattern PH1, to ensure that no light is emitted toward the oncoming vehicle 100. In this example, the lamp controller 60 dims or deactivates the luminous intensity of a partial projection area (oncoming vehicle area P122) depending on the oncoming vehicle 100 in the second light distribution pattern P12B and the third light distribution pattern P13B, which are projected onto the vehicle own lane of the curved road R2.

As described above, the third light distribution pattern P13 formed by the third optical unit 90 is divided into a plurality of projection areas, each of which may be independently changed for the illumination state thereof. Therefore, the lamp controller 60 reduces the projection luminous intensity of the surroundings of the oncoming vehicle 100 by controlling the third optical unit 90 to prevent or suppress light projection in an area including the oncoming vehicle 100 among the plurality of projection areas of the third light distribution pattern P13. The lamp controller 60 independently adjusts the luminous intensity of a partial projection area in the second light distribution pattern P12 and the luminous intensity of a partial projection area in the third light distribution pattern P13. The lamp controller 60 does not adjust the luminous intensity of a projection area in the second light distribution pattern P12A and a projection area in a third light distribution pattern P13A, which are projected onto the opposing lane of the curved road R2. In other words, the lamp controller 60 projects uniform light across the entirety of the second light distribution pattern P12A and also projects uniform light across the entirety of the third light distribution pattern P13A.

The first embodiment has described a case where the vehicle 1 approaches the curved road R2 that curves to the right, but is not limited thereto. For example, even when the vehicle 1 approaches a curved road that curves to the left, the lamp controller 60 adjusts the luminous intensity of a partial projection area depending on the position of the detected oncoming vehicle 100 in the second and third light distribution patterns P12 and P13. Further, for example, when a target object is a preceding vehicle, the lamp controller 60 similarly adjusts the luminous intensity of the second and third light distribution patterns P12 and P13.

In this way, in both the low-beam light distribution pattern PL and the high-beam light distribution pattern PH, the headlamp 10 according to the first embodiment is capable of projecting the second distribution pattern P12 along the cutoff line CL of the first light distribution pattern P11 to overlap with the cutoff line CL and adjusting the luminous intensity of a partial projection area, which depends on the position of a target object relative to the vehicle 1, in the second light distribution pattern P12. According to this configuration, since the luminous intensity of the projection area depending on the position of the oncoming vehicle 100 in the second light distribution pattern P12 may be dimmed or deactivated, the occurrence of glare toward the oncoming vehicle 100 may be prevented or suppressed. Further, since the second light distribution pattern P12 may be projected onto areas outside the position of the oncoming vehicle 100, the visibility of the low-beam light distribution pattern PL and the high-beam light distribution pattern PH may be enhanced. This allows for the projection of low-beam and high-beam light distribution patterns with sufficient visibility while preventing or suppressing the occurrence of glare.

Further, according to the headlamp 10, it is possible to project the second light distribution pattern P12 with a partial area adjusted for luminous intensity onto a target object located in the left-right direction of the vehicle 1 as well as a target object located in the longitudinal direction in front of the vehicle 1. In this way, by adjusting the luminous intensity of the second light distribution pattern depending on the position of the target object in the left-right direction or the longitudinal direction, the occurrence of glare toward the target object may be further reliably prevented or suppressed.

Further, according to the headlamp 10, the second light distribution pattern P12 that the headlamp 10 may project is divided into a plurality of projection areas, each of which may be independently adjusted for the luminous intensity thereof. Therefore, it is possible to precisely change a projection area and a non-projection area in the second light distribution pattern P12. This ensures that sufficient visibility is maintained in areas outside an area where a target object is present while preventing or suppressing the occurrence of glare toward the target object.

Further, according to the headlamp 10, it is possible to adjust the luminous intensity of a partial projection area of the second light distribution pattern P12 independently from the third light distribution pattern P13 projected onto an area above the cutoff line CL. Therefore, in the high-beam light distribution as well, the high-beam light distribution pattern PH with excellent visibility may be projected while preventing or suppressing the occurrence of glare.

Further, the headlamp 10 adjusts the luminous intensity of a partial projection area of the second light distribution pattern P12 in the vehicle own lane when the vehicle 1 approaches the curved road R2 and an oncoming vehicle or preceding vehicle is present at a position closer to the vehicle own lane than the left-right direction center in front of the vehicle 1. This configuration allows luminous intensity adjustments for a projection area of the second light distribution pattern P12 in the vehicle own lane, even in a situation where light of the second light distribution pattern P12 projected onto the vehicle own lane may also be projected onto the opposing lane because the road is curved. Therefore, the occurrence of glare toward an oncoming vehicle or preceding vehicle may be reliably prevented or suppressed even when driving on the curved road.

Further, according to the headlamp 10, by projecting the second light distribution pattern P12 along the cutoff line CL of the first light distribution pattern P11 to overlap with the cutoff line CL, the light-dark boundary of the cutoff line CL, which is formed when projecting both the first and second light distribution patterns P11, may be blurred compared to the light-dark boundary of the cutoff line CL formed when projecting only the first light distribution pattern P11. This reduces the contrast between light and dark at the boundary of the cutoff line CL, enabling the projection of a low-beam light distribution pattern that is less likely to create visual discomfort.

Second Embodiment

Next, the high-beam light distribution pattern PH projected by the headlamp 10 according to a second embodiment will be described with reference to FIGS. 9 to 13.

Figure 9:
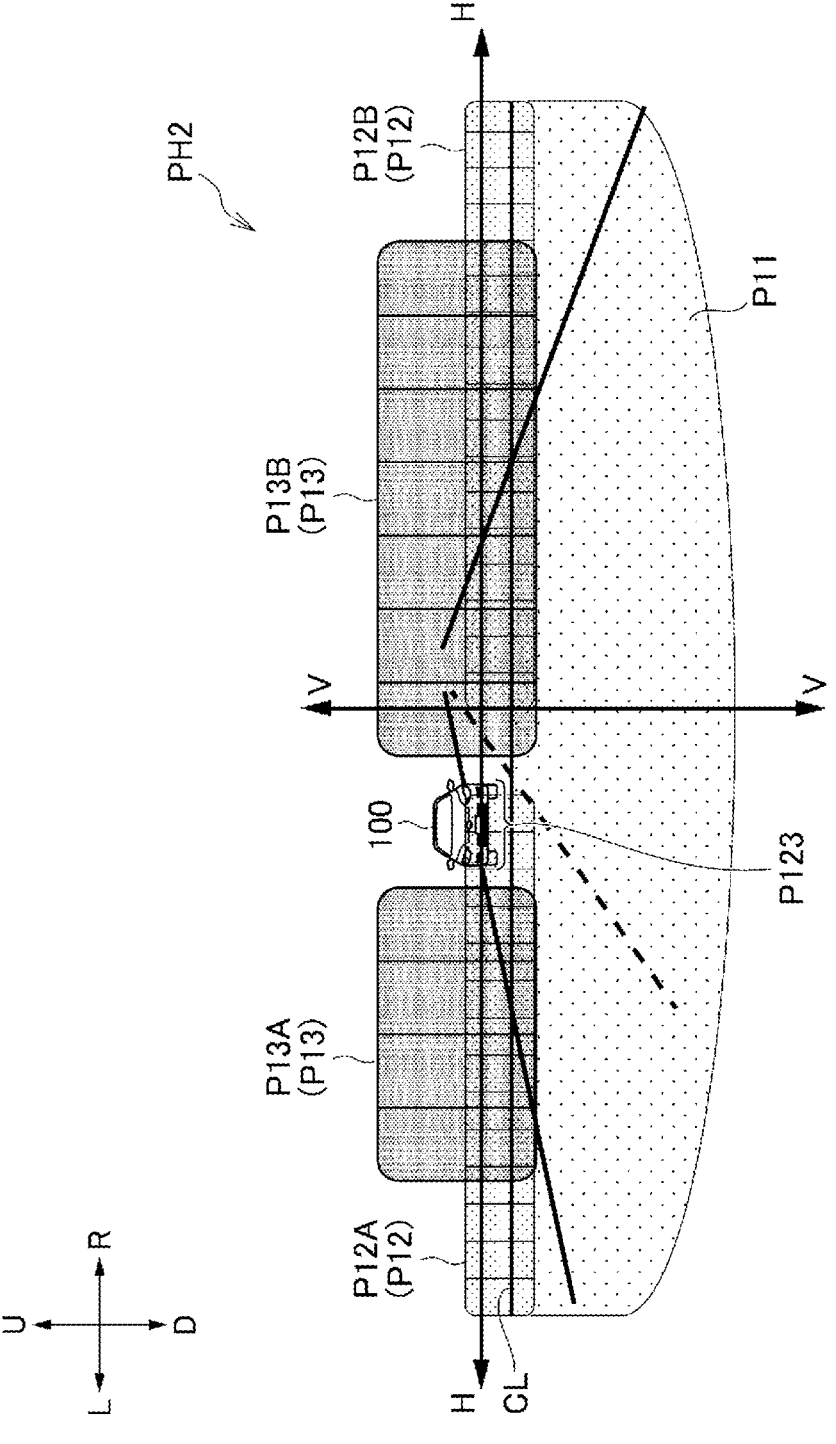
FIG. 9 is a diagram illustrating an example of a high-beam light distribution pattern projected when the distance between a detected oncoming vehicle and the vehicle is equal to or greater than a threshold.

FIG. 9 is a diagram illustrating an example of a high-beam light distribution pattern PH2 projected by the headlamp 10 when the distance between the detected oncoming vehicle 100 and the vehicle 1 is equal to or greater than a threshold. In the example illustrated in FIG. 9, when the camera 30 of the vehicle 1 detects the oncoming vehicle 100 on the front left side, it outputs imaging data on the oncoming vehicle 100 to the vehicle controller 50, just as in the case of the first embodiment. The vehicle controller 50 transmits surrounding environment information on the oncoming vehicle 100 detected from the imaging data to the lamp controller 60. Then, the lamp controller 60 varies the activated state of the first optical unit 70, the second optical unit 80, and the third optical unit 90 based on the surrounding environment information, and projects the high-beam light distribution pattern PH2, which is constituted with the first light distribution pattern P11, the second light distribution pattern P12, and the third light distribution pattern P13, as illustrated in FIG. 9.

The lamp controller 60 does not adjust the luminous intensity in the second light distribution pattern P12 of the high-beam light distribution pattern PH2 when the distance between the vehicle 1 and the oncoming vehicle 100 is equal to or greater than a preset threshold. In other words, the lamp controller 60 maintains the projection state of the second light distribution pattern P12 in the reference state as illustrated in FIG. 4 without adjusting the luminous intensity of a partial projection area depending on the position of the oncoming vehicle 100 on the road. Meanwhile, even when the distance between the vehicle 1 and the oncoming vehicle 100 is equal to or greater than the preset threshold, the lamp controller 60 adjusts the luminous intensity of a partial projection area, which depends on the position of the oncoming vehicle 100 on the road, in the third light distribution pattern P13, to ensure that no light is emitted toward the oncoming vehicle 100. The threshold of the distance between the vehicle 1 and the oncoming vehicle 100 is, for example, 200 m.

In this example, the lamp controller 60 keeps the second light distribution pattern P12 of the high-beam light distribution pattern PH2 activated, without adjusting the luminous intensity of a partial projection area (oncoming vehicle area P123) depending on the oncoming vehicle 100 in the second light distribution pattern P12 projected onto the opposing lane. Further, in the third light distribution pattern P13 of the high-beam light distribution pattern PH2, the lamp controller 60 dims or deactivates the luminous intensity of a partial projection area (oncoming vehicle area P123) depending on the oncoming vehicle 100 in the third light distribution pattern P13A projected onto the opposing lane.

Figure 10:
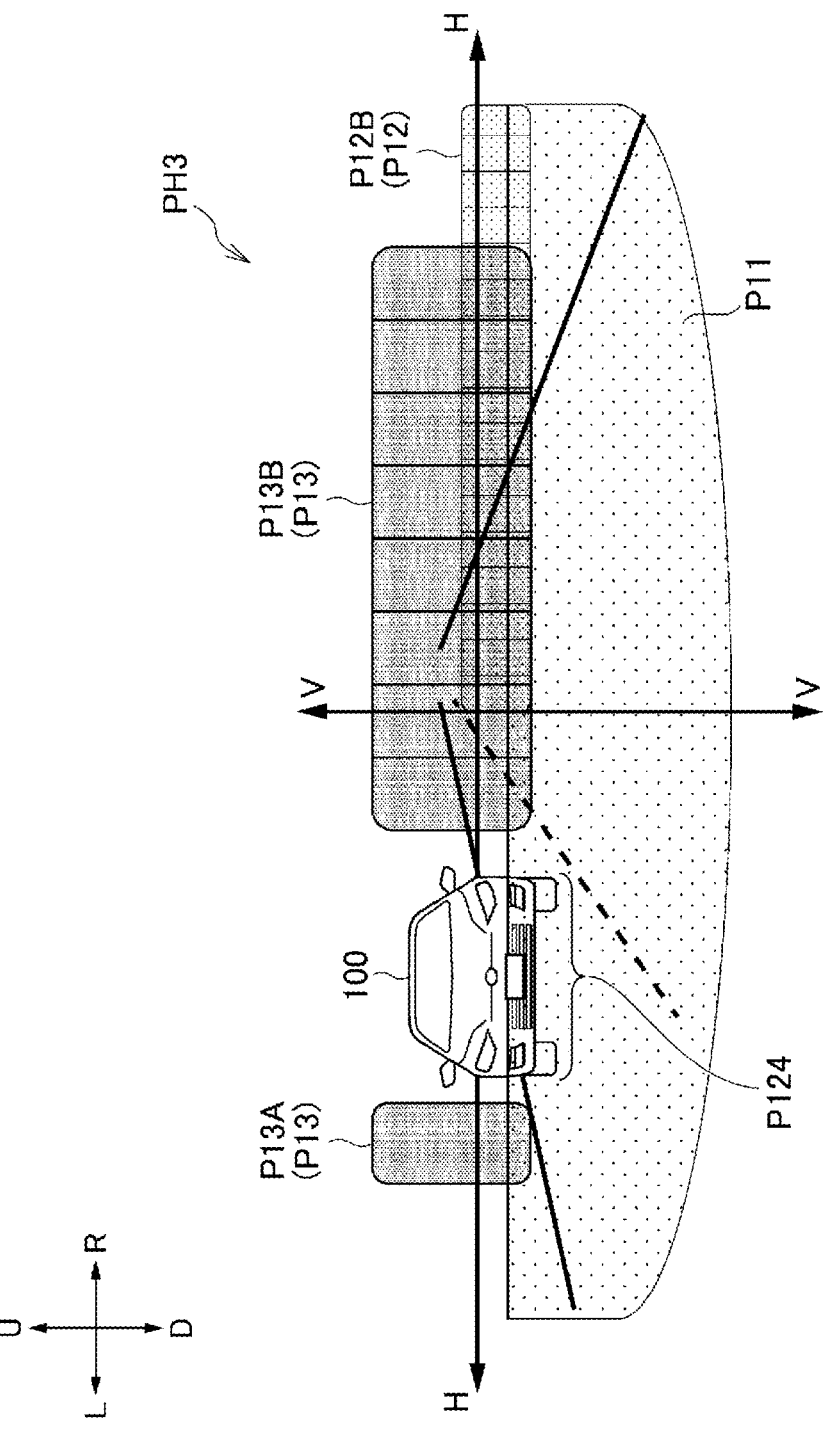
FIG. 10 is a diagram illustrating an example of a high-beam light distribution pattern projected when the distance between the detected oncoming vehicle and the vehicle is less than the threshold.

FIG. 10 is a diagram illustrating an example of a high-beam light distribution pattern PH3 projected by the headlamp 10 when the distance between the detected oncoming vehicle 100 and the vehicle 1 is less than the threshold. In the example illustrated in FIG. 10, the camera 30 of the vehicle 1 detects the oncoming vehicle 100 and the lamp controller 60 varies the projection state of the high-beam light distribution pattern PH3, which is constituted with the first distribution pattern P11, the second distribution pattern P12, and the third distribution pattern P13, as it does in the case illustrated in FIG. 9.

When the distance between the vehicle 1 and the oncoming vehicle 100 is less than the preset threshold, the lamp controller 60 adjusts the luminous intensity of all projection areas of the opposing lane in the second light distribution pattern P12 of the high-beam light distribution pattern PH3, to ensure that no light is emitted toward the oncoming vehicle 100. Further, when the distance between the vehicle 1 and the oncoming vehicle 100 is less than the preset threshold, the lamp controller 60 adjusts the luminous intensity of a partial projection area, which depends on the position of the oncoming vehicle 100 on the road, in the third light distribution pattern P13, to ensure that no light is emitted toward the oncoming vehicle 100.

In this example, the lamp controller 60 dims or deactivates the luminous intensity of all projection areas in the second light distribution pattern P12A projected onto the opposing lane. Further, the lamp controller 60 dims or deactivates the luminous intensity of a partial projection area (oncoming vehicle area P124) depending on the oncoming vehicle 100 in the third light distribution pattern P13A projected onto the opposing lane. The lamp controller 60 may adjust the luminous intensity of the second light distribution pattern P12A stepwise according to a change in the distance between the vehicle 1 and the oncoming vehicle 100. Specifically, the lamp controller 60 may initiate adjusting the luminous intensity of the second light distribution pattern P12A when the distance between the vehicle 1 and the oncoming vehicle 100 falls below the threshold (e.g., 200 m), and may gradually decrease the luminous intensity of all projection areas in the second light distribution pattern P12A as the distance shortens.

Figure 11:
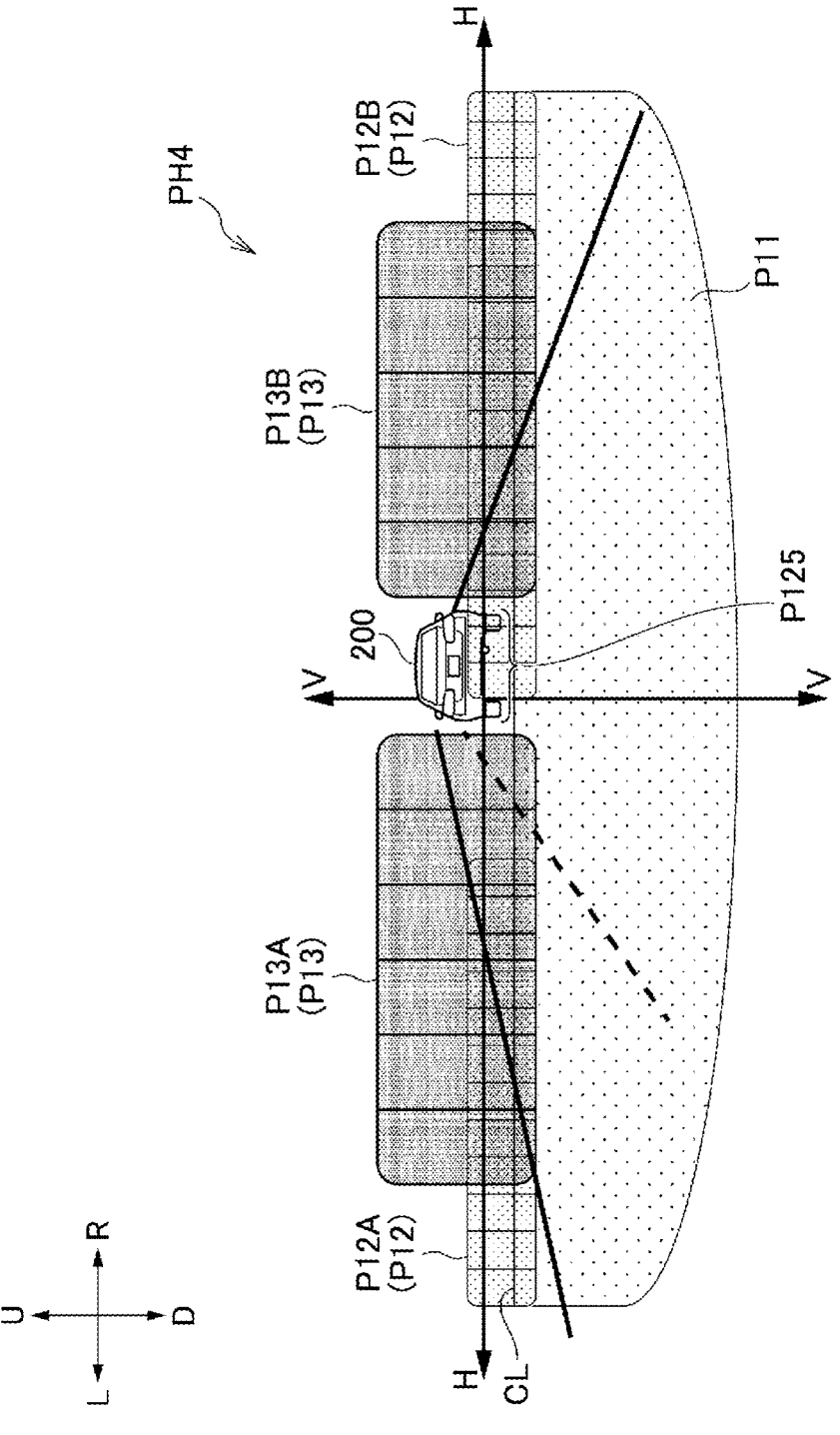
FIG. 11 is a diagram illustrating an example of a high-beam light distribution pattern projected when the distance between a detected preceding vehicle and the vehicle is equal to or greater than a threshold.

FIG. 11 is a diagram illustrating an example of a high-beam light distribution pattern PH4 projected by the headlamp 10 when the distance between a detected preceding vehicle 200 and the vehicle 1 is equal to or greater than a threshold. In the example illustrated in FIG. 11, when the camera 30 of the vehicle 1 detects the preceding vehicle 200, it outputs imaging data on the preceding vehicle 200 to the vehicle controller 50. The vehicle controller 50 transmits surrounding environment information on the preceding vehicle 200 detected from the imaging data to the lamp controller 60. Then, the lamp controller 60 varies the activated state of the first optical unit 70, the second optical unit 80, and the third optical unit 90 based on the surrounding environment information, and projects the high-beam light distribution pattern PH4, which is constituted with the first light distribution pattern P11, the second light distribution pattern P12, and the third light distribution pattern P13, as illustrated in FIG. 11.

The lamp controller 60 does not adjust the luminous intensity of the second light distribution pattern P12 of the high-beam light distribution pattern PH4 when the distance between the vehicle 1 and the preceding vehicle 200 is equal to or greater than a preset threshold. In other words, the lamp controller 60 maintains the projection state of the second light distribution pattern P12 in the reference state as illustrated in FIG. 4 without adjusting the luminous intensity of a partial projection area depending on the position of the preceding vehicle 200 on the road. Further, when the distance between the vehicle 1 and the preceding vehicle 200 is equal to or greater than the preset threshold, the lamp controller 60 adjusts the luminous intensity of a partial projection area depending on the position of the preceding vehicle 200 in the third light distribution pattern P13 of the high-beam light distribution pattern PH4, to ensure that no light is emitted toward the preceding vehicle 200. The threshold of the distance between the vehicle 1 and the preceding vehicle 200 is, for example, 100 m.

In this example, the lamp controller 60 keeps the second light distribution pattern P12 of the high-beam light distribution pattern PH4 activated without adjusting the luminous intensity of a partial projection area (preceding vehicle area P125) depending on the preceding vehicle 200 in the second light distribution pattern P12 projected onto the vehicle own lane. Meanwhile, in the third light distribution pattern P13 of the high-beam light distribution pattern PH4, the lamp controller 60 dims or deactivates the luminous intensity of a partial projection area (preceding vehicle area P125) depending on the preceding vehicle 200 in the third light distribution pattern P13B projected onto the vehicle own lane.

Figure 12:
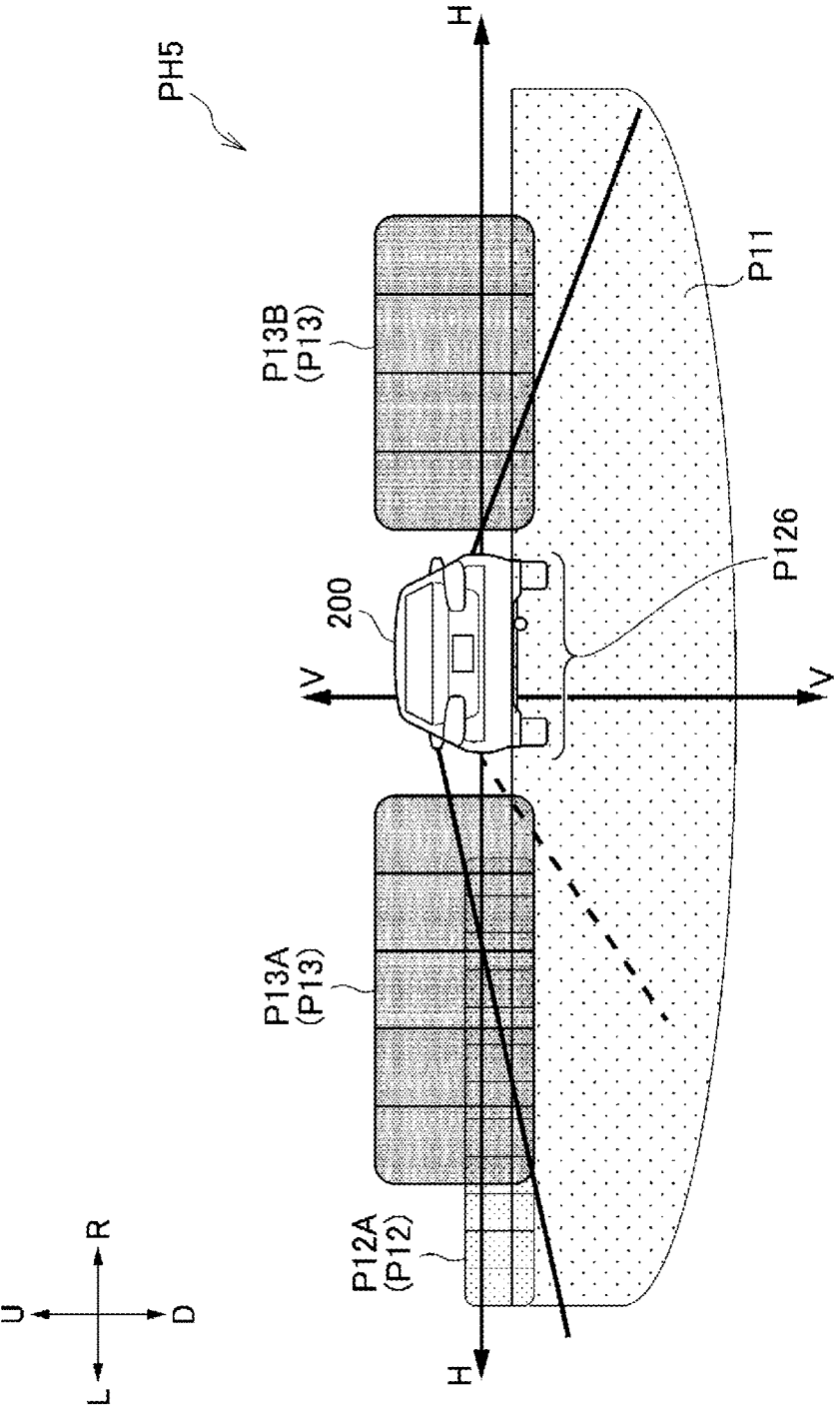
FIG. 12 is a diagram illustrating an example of a high-beam light distribution pattern projected when the distance between the detected preceding vehicle and the vehicle is less than the threshold.

FIG. 12 is a diagram illustrating an example of a high-beam light distribution pattern PH5 projected by the headlamp 10 when the distance between the detected preceding vehicle 200 and the vehicle 1 is less than the threshold. In the example illustrated in FIG. 12, the camera 30 of the vehicle 1 detects the preceding vehicle 200 and the lamp controller 60 varies the projection state of the high-beam light distribution pattern PH5, which is constituted with the first distribution pattern P11, the second distribution pattern P12, and the third distribution pattern P13, as in the case illustrated in FIG. 11.

When the distance between the vehicle 1 and the preceding vehicle 200 is less than the preset threshold, the lamp controller 60 adjusts the luminous intensity of all projection areas, which are in the vehicle own lane where the preceding vehicle 200 is driving, in the second light distribution pattern P12 of the high-beam light distribution pattern PH5, to ensure that no light is emitted toward the preceding vehicle 200. Further, even when the distance between the vehicle 1 and the preceding vehicle 200 is less than the preset threshold, the lamp controller 60 adjusts the luminous intensity of a partial projection area depending on the position of the preceding vehicle 200 in the third light distribution pattern P13 of the high-beam light distribution pattern PH5, to ensure that no light is emitted toward the preceding vehicle 200.

In this example, the lamp controller 60 dims or deactivates the luminous intensity of all projection areas in the second light distribution pattern P12B projected onto the vehicle own lane. Further, the lamp controller 60 dims or deactivates the luminous intensity of a partial projection area (preceding vehicle area P126) depending on the preceding vehicle 200 in the third light distribution pattern P13B projected onto the vehicle own lane. The lamp controller 60 may adjust the luminous intensity of the second light distribution pattern P12B stepwise according to a change in the distance between the vehicle 1 and the preceding vehicle 200. Specifically, the lamp controller 60 may initiate adjusting the luminous intensity of the second light distribution pattern P12B when the distance between the vehicle 1 and the preceding vehicle 200 falls below the threshold (e.g., 100 m), and may gradually decrease the luminous intensity of all projection areas in the second light distribution pattern P12B as the distance shortens.

In this way, the headlamp 10 according to the second embodiment enables stepwise adjustment of the luminous intensity of all projection areas, which are in the lane where a target object is present, in the second light distribution pattern P12 according to a change in the distance between the vehicle 1 and the target object. According to this configuration, by dimming or brightening all projection areas of the second light distribution pattern P12 in the lane where the target object is present in stages, the occurrence of glare toward the target object may be prevented or suppressed while maintaining sufficient visibility of a projection area where the target object is present.

By the way, it is assumed that the rate at which the distance between the vehicle 1 and the oncoming vehicle 100 decreases is faster than the rate at which the distance between the vehicle 1 and the preceding vehicle 200 decreases, and a driver of the oncoming vehicle 100 faces the headlamp 10 of the vehicle 1. Therefore, the possibility of glare due to light projected from the headlamp 10 is higher for the oncoming vehicle 100 than for the preceding vehicle 200, even when the distance between the target object and the vehicle 1 is large. Accordingly, it is desirable to set the distance between the vehicle 1 and the target object when the luminous intensity adjustment of a projection area is initiated to be farther when the target object is the oncoming vehicle 100 than when the target object is the preceding vehicle 200.

Accordingly, in this example, when a target object is the oncoming vehicle 100, the headlamp 10 initiates adjusting the luminous intensity of a projection area corresponding to the oncoming vehicle 100 when the distance between the vehicle 1 and the oncoming vehicle 100 falls below 200 m. Meanwhile, when a target object is the preceding vehicle 200, the headlamp 10 initiates adjusting the luminous intensity of a projection area corresponding to the preceding vehicle 200 when the distance between the vehicle 1 and the preceding vehicle 200 falls below 100 m. In this way, the headlamp 10 of the present embodiment initiates adjusting the luminous intensity of a partial projection area when the distance between the vehicle 1 and a target object falls below a predetermined threshold, with different initiation timings for the luminous intensity adjustment depending on whether a target object is the oncoming vehicle 100 or the preceding vehicle 200. According to this configuration, the timing for initiating the luminous intensity adjustment may vary according to the type of target object, which accurately prevents or suppresses the occurrence of glare while further enhancing visibility.

Modification of Second Embodiment

Figure 13:
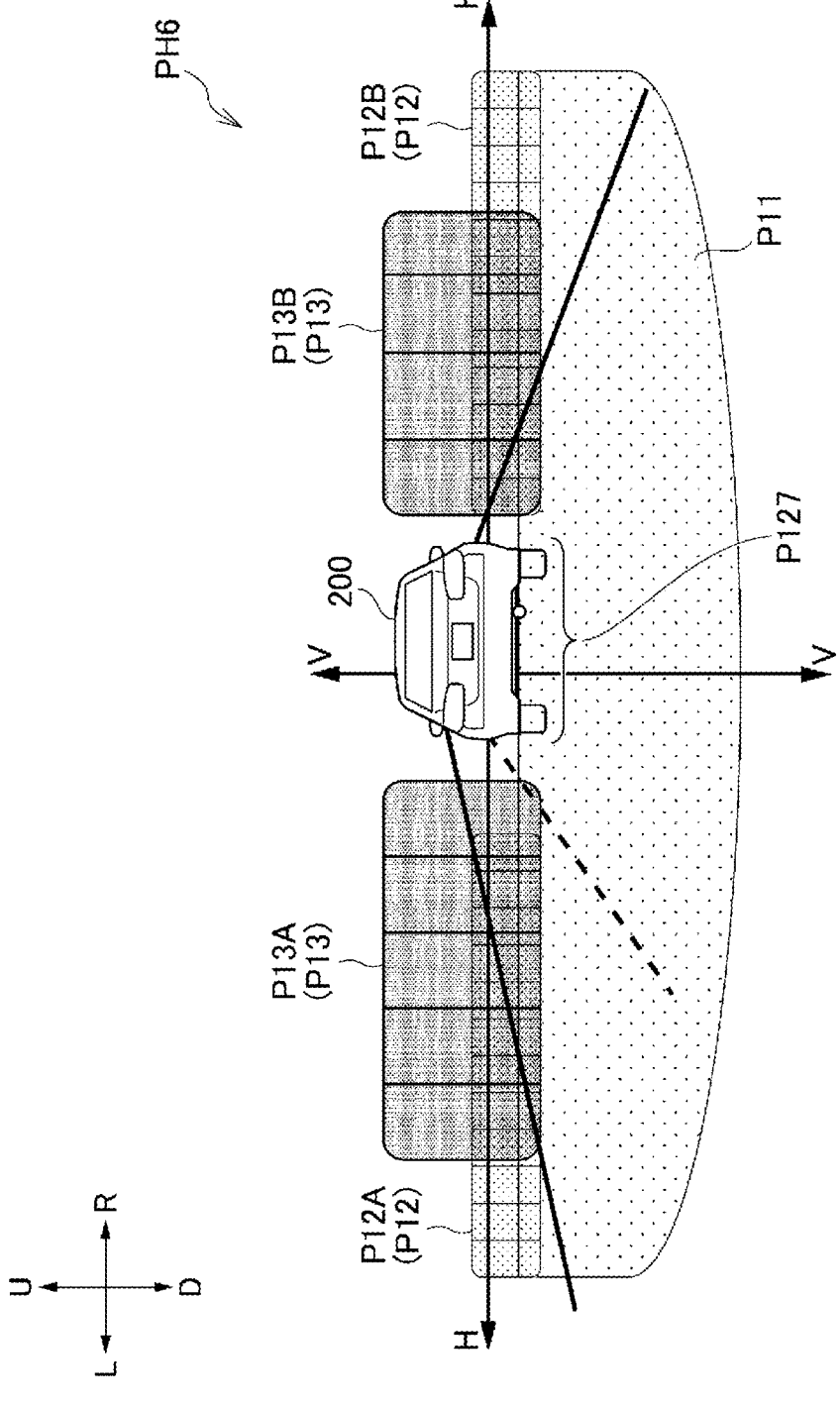
FIG. 13 is a diagram illustrating a modification of a high-beam light distribution pattern projected when the distance between the detected preceding vehicle and the vehicle is less than the threshold.

FIG. 13 is a diagram illustrating a modification of a high-beam light distribution pattern projected by the headlamp 10 when the distance between the detected preceding vehicle 200 and the vehicle 1 is less than a threshold.

In the above second embodiment, as illustrated in FIG. 12, when the distance between the vehicle 1 and the preceding vehicle 200 is less than a preset threshold, the lamp controller 60 adjusts the luminous intensity of all projection areas, which are in the vehicle own lane where the preceding vehicle 200 is driving, in the second light distribution pattern P12 of the high-beam light distribution pattern PH5 stepwise according to a change in distance. By contrast, in this modification, as illustrated in FIG. 13, in the second light distribution pattern P12 of a high-beam light distribution pattern PH6, the lamp controller 60 adjusts the luminous intensity of only a partial projection area depending on the position of the preceding vehicle 200 in the second light distribution pattern P12B stepwise according to a change in distance. In other words, in this modification, the lamp controller 60 does not adjust the luminous intensity of a projection area, outside the position of the preceding vehicle 200, in the second light distribution pattern P12B.

For example, the lamp controller 60 dims or deactivates only a partial projection area (preceding vehicle area P127) depending on the preceding vehicle 200 in the second light distribution pattern P12B projected onto the vehicle own lane. Specifically, the lamp controller 60 initiates the luminous intensity adjustment when the distance between the vehicle 1 and the preceding vehicle 200 falls below 100 m, gradually reducing the luminous intensity of the preceding vehicle area P127 depending on the preceding vehicle 200 in the second light distribution pattern P12B as the distance shortens. The luminous intensity adjustment of the lamp controller 60 in the third light distribution pattern P13 of the high-beam light distribution pattern PH6 is the same as the processing in FIG. 12 of the second embodiment.

This modification has described a case where a target object is the preceding vehicle 200 but is not limited thereto. For example, the luminous intensity of a projection area may also be adjusted in the same manner even when a target object is the oncoming vehicle 100 (see, e.g., FIG. 10). In other words, in FIG. 10, the lamp controller 60 may adjust the luminous intensity of only a partial projection area (oncoming vehicle area P124) depending on the oncoming vehicle 100 in the second light distribution pattern P12A of the high-beam light distribution pattern PH3 stepwise according to a change in the distance between the vehicle 1 and the oncoming vehicle 100.

Even when the luminous intensity of only a partial projection area depending on a target object in the second light distribution pattern P12 is dimmed or brightened in stages as in the headlamp 10 according to this modification, the occurrence of glare toward the target object may be effectively prevented or suppressed while maintaining sufficient visibility in the projection area where the target object is present. Further, the visibility of a projection area where no target object is present in the second light distribution pattern P12 may be further enhanced.

The above embodiments have described cases where a single oncoming vehicle or preceding vehicle is detected as a target object but are not limited to such cases. For example, multiple target objects may be detected, and in such cases, at least one of the position and distance for each detected target object may be determined, and the luminous intensity of a projection area may be adjusted for each target object based on the determined result.

In the above embodiments, the luminous intensity of at least a partial projection area depending on a target object is adjusted according to a change in the distance between the vehicle 1 and the target object, but is not limited to this example. In addition to or instead of a change in the distance between the vehicle 1 and the target object, the luminous intensity of at least a partial projection area may also be adjusted according to a change in the relative speed between the vehicle 1 and the target object.

The above embodiments have described cases where the vehicle 1 is driving in the right lane, but the present disclosure may also be applied to cases where the vehicle 1 is driving in the left lane.

In the above embodiments, the headlamp 10 may include a single optical unit capable of implementing the functions of the first optical unit 70, the second optical unit 80, and the third optical unit 90. In this case, the first optical unit 70, the second optical unit 80, and the third optical unit 90 may be configured as a common optical unit, thereby reducing the number of components.

In the above embodiments, the headlamp 10 may include the second optical unit 80 and an optical unit capable of implementing the functions of both the first optical unit 70 and the third optical unit 90. Further, the headlamp 10 may include the third optical unit 90 and an optical unit capable of implementing the functions of both the first optical unit 70 and the second optical unit 80. In these cases, the number of components may be reduced.

In the above embodiments, the first optical unit 70, the second optical unit 80, and the third optical unit 90 may be constituted with, for example, at least one light source, a driving mirror, and an optical system such as lenses and mirrors. The driving mirror may be constituted with a digital mirror device (DMD) such as a micro electro mechanical system (MEMS) mirror, or a rotating blade mirror.

In the above embodiments, the lamp controller 60 is installed in the headlamp 10. However, the lamp controller 60 may be installed in the vehicle 1 instead of the headlamp 10. In other words, the lamp controller 60 may be integrated into the vehicle controller 50.

In the above embodiments, the camera 30 is installed in the vehicle 1. However, the camera 30 may be installed in the headlamp 10 instead of the vehicle 1.

As described above, this specification discloses the following clauses.

(1) A vehicle headlamp mounted on a vehicle, and capable of forming at least:

a first light distribution pattern projected onto an area below a cutoff line; and a second light distribution pattern projected along the cutoff line to overlap with the cutoff line, in which at least a partial projection area of the second light distribution pattern is adjusted in luminous intensity according to a position of a target object outside the vehicle.

According to this configuration, a vehicle headlamp capable of projecting a light distribution pattern for providing sufficient visibility while preventing or suppressing the occurrence of glare may be provided.

(2) The vehicle headlamp described in item (1), in which the position includes at least one of a position in a left-right direction as viewed from the vehicle and a position in a longitudinal direction as viewed from the vehicle.

According to this configuration, the occurrence of glare toward a target object may be further reliably prevented or suppressed by adjusting the luminous intensity of the second light distribution pattern according to the left-right direction position or the longitudinal direction position of the target object.

(3) The vehicle headlamp described in item (1) or (2), in which the second light distribution pattern is divided into a plurality of areas that are adjustable in luminous intensity independently of each other.

According to this configuration, the projection area of the second light distribution pattern may be finely changed, ensuring that the occurrence of glare toward a target object may be prevented or suppressed while maintaining sufficient visibility in areas outside an area where the target object is present.

(4) The vehicle headlamp described in any one of items (1) to (3), in which the target object includes an oncoming vehicle or preceding vehicle that is present in front of the vehicle, and when the vehicle curves and the oncoming vehicle or preceding vehicle is present in front of the vehicle, the at least partial projection area of the second light distribution pattern is an area in a vehicle own lane of the second light distribution pattern.

According to this configuration, even when light projected onto the vehicle own lane of the second light distribution pattern may also be projected onto an opposing lane, the occurrence of glare toward the oncoming vehicle may be reliably prevented or suppressed even during driving on a curved road since the area in the vehicle own lane of the second light distribution pattern is adjusted in luminous intensity.

(5) The vehicle headlamp described in any one of items (1) to (4), in which the at least partial projection area of the second light distribution pattern is adjusted in luminous intensity stepwise according to a change in a distance between the vehicle and the target object.

According to this configuration, the luminous intensity of at least part of the second light distribution pattern is dimmed or brightened in stages, thereby balancing prevention or suppression of the occurrence of glare toward a target object with maintaining sufficient visibility in a projection area where the target object is present.

(6) The vehicle headlamp described in any one of items (1) to (5), in which when the distance between the vehicle and the target object falls below a predetermined threshold, luminous intensity adjustment of the at least partial projection area is initiated, and a timing of initiating the luminous intensity adjustment differs depending on whether the target object is the oncoming vehicle or preceding vehicle.

According to this configuration, highly accurate light distribution control is possible by varying the initiation timing of luminous intensity adjustment according to the type of target object.

(7) The vehicle headlamp as described in any one of items (1) to (6), in which the vehicle headlamp is capable of further forming a third light distribution pattern projected onto at least an area above the cutoff line, and the at least partial projection area of the second light distribution pattern is adjusted in luminous intensity independently of light distribution of the third light distribution pattern.

According to this configuration, by adjusting the luminous intensity of at least part of the second light distribution pattern independently of light distribution of the third light distribution pattern, a light distribution pattern with excellent visibility may be projected while preventing or suppressing the occurrence of glare even during high-beam light distribution.

(8) The vehicle headlamp described in any one of items (1) to (7), in which the cutoff line formed when both the first light distribution pattern and the second light distribution pattern are projected is more blurred than the cutoff line formed when only the first light distribution pattern is projected.

According to this configuration, since the light-dark boundary of the cutoff line is blurred when both the first and second light distribution patterns are projected, a low-beam light distribution pattern with minimal visual discomfort may be projected.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle headlamp mounted on a vehicle, comprising:
a memory:
a controller coupled to the memory and configured to:
form a first light distribution pattern projected onto an area below a cutoff line;
form a second light distribution pattern projected along the cutoff line to overlap with the cutoff line;
adjust luminous intensity of at least a partial projection area of the second light distribution pattern according to a position of a target object outside the vehicle; and
vary a timing or a manner of an adjustment of the luminous intensity of the at least partial projection area of the second light distribution pattern depending on a type of the detected target object and a distance between the vehicle and the target object.

2. The vehicle headlamp according to claim 1, wherein the position includes at least one of a position in a left-right direction as viewed from the vehicle and a position in a longitudinal direction as viewed from the vehicle.

3. The vehicle headlamp according to claim 1, wherein the second light distribution pattern is divided into a plurality of areas of which respective luminous intensities are adjustable independently of each other.

4. The vehicle headlamp according to claim 1, wherein the target object includes an oncoming vehicle or a preceding vehicle that is present in front of the vehicle, and when the vehicle curves and the oncoming vehicle or the preceding vehicle is present in front of the vehicle, the at least partial projection area of the second light distribution pattern is an area in a vehicle own lane of the second light distribution pattern.

5. The vehicle headlamp according to claim 1, wherein the controller is further configured to adjust the luminous intensity of at least the partial projection area of the second light distribution pattern stepwise according to a change in a distance between the vehicle and the target object.

6. The vehicle headlamp according to claim 1, wherein when a distance between the vehicle and the target object falls below a predetermined threshold, the controller is further configured to initiate the adjustment of the luminous intensity of the at least partial projection area, and a timing of initiating the adjustment of the luminous intensity of the at least partial projection area differs depending on whether the target object is an oncoming vehicle or a preceding vehicle of the vehicle.

7. The vehicle headlamp according to claim 1, wherein the controller is further configured to;

form a third light distribution pattern projected onto at least an area above the cutoff line, and adjust the luminous intensity of the at least partial projection area of the second light distribution pattern independently of light distribution of the third light distribution pattern.

8. The vehicle headlamp according to claim 1, wherein the cutoff line formed when both the first light distribution pattern and the second light distribution pattern are projected is more blurred than the cutoff line formed when only the first light distribution pattern is projected.

9. The vehicle headlamp according to claim 1, wherein when a plurality of target objects are detected, the controller is configured to adjust the luminous intensity of the at least partial projection area of the second light distribution pattern based on a target object that is closer to the vehicle than another one of the plurality of target objects.

\* \* \* \* \*